(12) United States Patent
Kim et al.

(10) Patent No.: US 12,091,326 B2
(45) Date of Patent: Sep. 17, 2024

(54) METHOD FOR PRODUCING MANGANESE(II) SULFATE MONOHYDRATE FROM BY-PRODUCT OF ZINC REFINING PROCESS

(71) Applicant: KOREA ZINC CO., LTD., Seoul (KR)

(72) Inventors: Min Ji Kim, Ulsan (KR); Sang Chil Park, Ulsan (KR)

(73) Assignee: KOREA ZINC CO., LTD., Seoul (KR)

( * ) Notice: Subject to any disclaimer, the term of this patent is extended or adjusted under 35 U.S.C. 154(b) by 0 days.

(21) Appl. No.: 18/472,331

(22) Filed: Sep. 22, 2023

(65) Prior Publication Data
US 2024/0076199 A1 Mar. 7, 2024

Related U.S. Application Data

(63) Continuation of application No. PCT/KR2023/005959, filed on May 2, 2023.

(30) Foreign Application Priority Data

Sep. 2, 2022 (KR) .................. 10-2022-0111576
Nov. 18, 2022 (KR) .................. 10-2022-0155259

(51) Int. Cl.
*C01G 45/10* (2006.01)
*B01D 9/00* (2006.01)
*C01G 45/00* (2006.01)

(52) U.S. Cl.
CPC ............ *C01G 45/10* (2013.01); *B01D 9/0031* (2013.01); *C01G 45/003* (2013.01);
(Continued)

(58) Field of Classification Search
CPC .... C01G 45/10; C01G 45/003; B01D 9/0031; B01D 2009/0086; B01D 11/00;
(Continued)

(56) References Cited

U.S. PATENT DOCUMENTS 3,397,130 A * 8/1968 Brantley .................. C22B 47/00
423/52
10,995,014 B1   5/2021 Fraser et al.
(Continued)

FOREIGN PATENT DOCUMENTS

CN   101698514 B   5/2011
CN   104591291 A   5/2015
(Continued)

OTHER PUBLICATIONS

English translation of CN-114107662-A Description (Year: 2022).*
(Continued)

*Primary Examiner* — Anthony J Zimmer
(74) *Attorney, Agent, or Firm* — HSML P. C.

(57) ABSTRACT

A method for producing manganese(II) sulfate monohydrate includes a pulverization and washing step of pulverizing and washing a manganese-containing by-product, a leaching step of leaching the pulverized manganese-containing by-product after the pulverization and washing step to produce a leachate, a neutralization step of neutralizing the leachate produced in the leaching step, an impurity removal step of removing impurities from the leachate neutralized in the neutralization step, a solvent extraction step of recovering manganese in the form of an aqueous solution of manganese sulfate from a process liquid subjected to the impurity removal step by using a solvent extraction method, and a crystallization step of producing manganese(II) sulfate monohydrate by evaporating and concentrating the aqueous solution of manganese sulfate produced in the solvent extraction step.

16 Claims, 2 Drawing Sheets

(52) U.S. Cl.
CPC .. *B01D 2009/0086* (2013.01); *C01P 2002/72* (2013.01); *C01P 2006/40* (2013.01)

(58) Field of Classification Search
CPC .. B01D 11/04; C01P 2006/40; C01P 2002/72; C01P 2009/0086; C22B 7/007; C22B 47/0054
USPC .......................................................... 423/52
See application file for complete search history.

(56) References Cited

U.S. PATENT DOCUMENTS

| | | | |
|---|---|---|---|
| 2008/0038168 A1 | 2/2008 | Cheng et al. | |
| 2011/0123419 A1* | 5/2011 | Shin ........................ | C01G 45/10 423/49 |
| 2020/0399736 A1 | 12/2020 | Joensuu et al. | |
| 2021/0344059 A1* | 11/2021 | Ekman .................... | H01M 6/52 |
| 2023/0193422 A1* | 6/2023 | Arakawa ................. | C22B 7/001 423/50 |

FOREIGN PATENT DOCUMENTS

| | | | | | |
|---|---|---|---|---|---|
| CN | 105 886 781 A | * | 8/2016 | ............... | C22B 1/02 |
| CN | 106119565 B | * | 9/2017 | | |
| CN | 109399723 A | | 3/2019 | | |
| CN | 109897968 A | * | 6/2019 | | |
| CN | 110157911 A | | 8/2019 | | |
| CN | 110 013 822 B | * | 2/2020 | ............ | B01J 20/041 |
| CN | 112939089 A | * | 6/2021 | | |
| CN | 113174496 A | | 7/2021 | | |
| CN | 114107662 A | * | 3/2022 | | |
| CN | 114956189 A | | 8/2022 | | |
| KR | 100 975 317 B1 | * | 8/2010 | ............ | H01M 10/54 |
| KR | 101011260 B1 | * | 1/2011 | | |
| KR | 101266437 B1 | | 5/2013 | | |
| KR | 20150050632 A | | 5/2015 | | |
| KR | 1020150050630 A | | 5/2015 | | |
| KR | 1020150050632 A | | 5/2015 | | |
| KR | 1020210120669 A | | 10/2021 | | |
| WO | WO 2010 086 407 A1 | * | 8/2010 | ............ | C22B 19/30 |
| WO | 2021215520 A1 | | 10/2021 | | |

OTHER PUBLICATIONS

English translation of KR 101011260 B1 (Year: 2011).*
English translation of CN-106119565-B Description (Year: 2017).*
English translation of CN-109897968-A Description (Year: 2019).*
Yoon, W., et al. Combined NMR and XAS Study on Local Environments and Electronic Structures of Electrochemically Li-Ion Deintercalated Li1ÀxCo1Õ3Ni1Õ3Mn1Õ3O2 Electrode System. Electrochemical and Solid-State Letters, 7 (3) A53-A55 (2004) (Year: 2004).*
English translation of CN-112939089-A Description (Year: 2021).*
International Search Report and Written Opinion issued in PCT/KR2023/005959, dated Jul. 8, 2023, 7 pages provided.

* cited by examiner

METHOD FOR PRODUCING MANGANESE(II) SULFATE MONOHYDRATE FROM BY-PRODUCT OF ZINC REFINING PROCESS

TECHNICAL FIELD

The present disclosure relates to a method for producing manganese(II) sulfate monohydrate ($MnSO_4 \cdot H_2O$) from a manganese-containing by-product generated during a zinc hydrometallurgy process. In particular, the present disclosure pertains to a method for producing high-purity manganese(II) sulfate monohydrate ($MnSO_4 \cdot H_2O$) that can be used as a raw material for cathode active materials in lithium-ion secondary batteries.

BACKGROUND

Recently, along with the rapid growth of the electric vehicle market, the demand for secondary batteries, typically lithium-ion secondary batteries, used as a power supply source for electric vehicles, is also rapidly increasing. A lithium-ion secondary battery is composed of a cathode, an anode, a separator, and an electrolyte. Manganese(II) sulfate monohydrate is widely used for manufacturing the cathode among others. Specifically, the cathode active material is manufactured by sintering a precursor and lithium. At this time, manganese(II) sulfate monohydrate is used as the main material of the precursor.

Conventionally, manganese(II) sulfate monohydrate has been mainly produced through a method of performing a leaching step and a crystallization step on a low-purity manganese ore or a manganese-containing material. However, most manganese ores are imported from specific countries such as China and India. Thus, if the supply of manganese ores from these countries is not smooth, it becomes difficult to supply manganese(II) sulfate monohydrate.

Meanwhile, in an electrolysis process of a zinc hydrometallurgy process, a by-product containing a large amount of manganese is generated. For example, in the electrolysis process of the zinc hydrometallurgy process, a manganese crust may be formed on the surface of an anode plate, and a manganese slime may be formed on the bottom of an electrolysis cell. Most of the manganese contained in the by-product is discarded without being recovered, causing a problem in terms of resource recycling.

SUMMARY

An object of the present disclosure is to provide a method for producing manganese sulfate, particularly high-purity manganese(II) sulfate monohydrate, from a manganese-containing by-product generated during a zinc hydrometallurgy process.

According to one embodiment, there is provided a method for producing manganese(II) sulfate monohydrate, including: a pulverization and washing step of pulverizing and washing a manganese-containing by-product; a leaching step of leaching the pulverized manganese-containing by-product after the pulverization and washing step to produce a leachate; a neutralization step of neutralizing the leachate produced in the leaching step; an impurity removal step of removing impurities from the leachate neutralized in the neutralization step; a solvent extraction step of recovering manganese in the form of an aqueous solution of manganese sulfate from a process liquid subjected to the impurity removal step by using a solvent extraction method; and a crystallization step of producing manganese(II) sulfate monohydrate by evaporating and concentrating the aqueous solution of manganese sulfate produced in the solvent extraction step.

According to one embodiment, an average particle size of the pulverized manganese-containing by-product may be 1 to 25 μm.

According to one embodiment, in the pulverization and washing step, the manganese-containing by-product may be washed with water to remove water-soluble impurities.

According to one embodiment, in the pulverization and washing step, an amount of water added for washing may be 1.5 to 3 times an amount of the manganese-containing by-product in weight ratio.

According to one embodiment, the leaching step may be performed by using an inorganic acid and a reducing agent.

According to one embodiment, in the leaching step, sulfuric acid may be used as the inorganic acid, and hydrogen peroxide may be used as the reducing agent.

According to one embodiment, the neutralization step may be performed by using at least one of the pulverized manganese-containing by-product, sodium hydroxide, calcium hydroxide, magnesium hydroxide, calcium oxide, and magnesium oxide.

According to one embodiment, the impurity removal step may include a first impurity removal step of removing heavy metal impurities and a second impurity removal step of removing light metal impurities.

According to one embodiment, the first impurity removal step may be performed through a precipitation reaction of heavy metal impurities by adding at least one of sodium sulfide, sodium hydrosulfide, ammonium hydrosulfide, and hydrogen sulfide as a precipitant.

According to one embodiment, the precipitant may be added at an equivalent ratio of 0.8 to 1.4 to the heavy metal impurities contained in the neutralized leachate.

According to one embodiment, the second impurity removal step may be performed through a precipitation reaction of light metal impurities by adding at least one of sodium fluoride, oxalic acid, and sodium oxalate as a precipitant.

According to one embodiment, the precipitant may be added at an equivalent ratio of 1 to 2.5 to the light metal impurities contained in a first impurity-removed liquid.

According to one embodiment, the solvent extraction step may include: a loading step of extracting manganese contained in the process liquid into an organic phase; a scrubbing step of washing the manganese-extracted organic phase with water; and a stripping step of recovering manganese in the form of an aqueous solution of manganese sulfate by adding sulfuric acid to the organic phase after the scrubbing step.

According to one embodiment, washing water obtained after the scrubbing step may be used for diluting an inorganic acid added in the leaching step.

According to one embodiment, the crystallization step may be performed at a temperature of 60 to 100 degrees C.

According to one embodiment, the manganese-containing by-product may include at least one of a manganese crust formed on a surface of an anode plate during an electrolysis process of a zinc hydrometallurgy process and a manganese slime formed on a bottom of an electrolysis cell during the electrolysis process of the zinc hydrometallurgy process.

According to various embodiments of the present disclosure, it is possible to produce manganese sulfate, particularly high-purity manganese(II) sulfate monohydrate, from a manganese-containing by-product generated during a zinc hydrometallurgy process.

Manganese(II) sulfate monohydrate according to the present disclosure can be suitably used as a raw material for a cathode active material of a lithium secondary battery.

DETAILED DESCRIPTION

Hereinafter, the present disclosure will be described with reference to the drawings.

Figure 1:
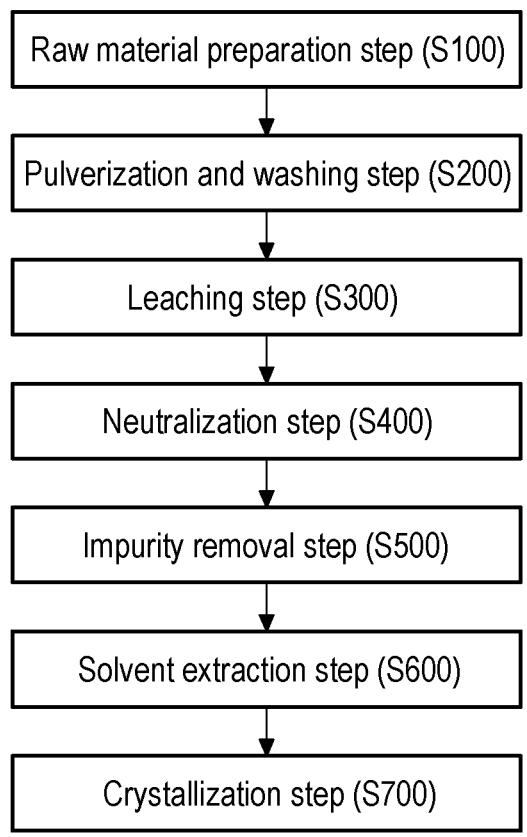
FIG. 1 is a process chart showing a method for producing manganese(II) sulfate monohydrate from a manganese-containing by-product according to one embodiment of the present disclosure.

FIG. 1 is a process chart showing a method for producing manganese(II) sulfate monohydrate from a manganese-containing by-product according to one embodiment of the present disclosure.

Referring to FIG. 1, the method for producing manganese (II) sulfate monohydrate from a manganese-containing by-product according to one embodiment of the present disclosure may include a raw material preparation step S100, a pulverization and washing step S200, a leaching step S300, a neutralization step S400, an impurity removal step S500, a solvent extraction step S600, and a crystallization step S700.

Raw Material Preparation Step S100

In the raw material preparation step S100, a manganese-containing by-product generated in an electrolysis process of a zinc hydrometallurgy process may be prepared as a manganese-containing raw material for producing manganese (II) sulfate monohydrate. Specifically, the manganese-containing by-product may include at least one of a manganese crust formed on the surface of an anode plate and a manganese slime formed on the bottom of an electrolysis cell in an electrolysis process of a zinc hydrometallurgy process. In the manganese-containing by-product, manganese may be included in the form of manganese oxide ($MnO_2$).

The manganese-containing by-product may contain impurities other than manganese (Mn). For example, the manganese-containing by-product may include calcium (Ca), potassium (K), lead (Pb), zinc (Zn), silver (Ag), sodium (Na), silicon (Si), magnesium (Mg) and the like as impurities. The composition of the manganese-containing by-product may be as shown in Table 1.

Pulverization and Washing Step S200

A pulverization and washing step S200 may be performed after the raw material preparation step S100.

In the pulverization and washing step S200, a pulverizing step may be performed to reduce the particle size of the manganese-containing by-product, and a washing step may be performed to remove at least some of the impurities contained in the manganese-containing by-product.

The average particle size of the manganese-containing by-product before performing the pulverizing step may be about 700 μm to 900 μm, and may be reduced to about 1 μm to about 25 μm by the pulverizing step. If the average particle size of the manganese-containing by-product is large, reactivity may become low, and leaching may be substantially difficult in the subsequent leaching step S300. Accordingly, the leaching efficiency in the leaching step S300 may be increased by lowering the average particle size of the manganese-containing by-product through the pulverizing step before performing the leaching step S300. For example, the pulverizing step may be performed using a milling machine such as a ball mill or a rod mill.

According to one embodiment of the present disclosure, the washing step may be performed simultaneously with the pulverizing step. For example, the pulverizing step and the washing step may be simultaneously performed using a wet pulverizing machine. Thereafter, some of the impurities (Ca, K, Mg, Na, etc.) contained in the manganese-containing by-product may be removed by solid-liquid separation. Alternatively, according to another embodiment, the pulverizing step and the washing step may be performed separately. In the washing step, in order to effectively remove the impurities contained in the manganese-containing by-product, the manganese-containing by-product may be washed with about 1.5 to 3 times as much water as the manganese-containing by-product in weight ratio.

Leaching Step S300

After the pulverization and washing step S200, a leaching step S300 may be performed.

In the leaching step S300, the pulverized manganese-containing by-product may be leached using an inorganic acid and a reducing agent. Specifically, at least one of sulfuric acid ($H_2SO_4$), hydrochloric acid (HCl) and nitric acid ($HNO_3$) may be used as the inorganic acid, and at least one of hydrogen peroxide ($H_2O_2$), iron sulfate ($FeSO_4$) and oxalic acid ($C_2H_2O_4$) may be used as the reducing agent. In addition, in the case of the inorganic acid, an inorganic acid diluted with water may be used. According to one embodiment of the present disclosure, sulfuric acid and hydrogen peroxide may be used as the inorganic acid and the reducing agent, respectively. In this case, manganese may be leached in the form of manganese sulfate ($MnSO_4$) from the manganese-containing by-product through the reaction formula (Formula 1) below, thereby obtaining a leachate.

$$MnO_2 + H_2O_2 + H_2SO_4 \rightarrow MnSO_4 + 2H_2O + O_2 \quad \text{(Formula 1)}$$

TABLE 1

| Mn | Ca | K | Pb | Zn | Ag | Na | Si |
|---|---|---|---|---|---|---|---|
| 30 to 45 | 0.1 to 3.5 | 0.1 to 3.5 | 0.1 to 4.0 | 0.1 to 4.0 | 0 to 0.05 | 0.05 to 0.3 | 0 to 0.05 |

(Unit: wt %)

The leaching step S300 may be performed at about 60 to 70 degrees C. The sulfuric acid concentration of the leachate may be 25 to 35 g/L, and the pH of the leachate may be 1 or less. In the leaching step S300, not only manganese but also other impurities may be leached together. For example, impurities such as calcium (Ca), potassium (K), lead (Pb), and zinc (Zn) may be leached together with manganese and contained in the leachate.

The manganese concentration in the leachate obtained in the leaching step S300 may be about 60 to 130 g/L. To this end, about 1.5 to 3 times as much water as the pulverized manganese-containing by-product in weight ratio may be used for dilution of the inorganic acid. At this time, washing water used in a scrubbing step S620 of a solvent extraction step S600 to be described later may be used as the water for diluting the inorganic acid. Through this, it is possible to recover manganese contained in the washing water, thereby increasing the recovery rate of manganese, and reducing the amount of water used.

Neutralization Step S400

After the leaching step S300, a neutralization step S400 may be performed.

In the neutralization step S400, a neutralizing agent may be added to raise the pH of the leachate obtained in the leaching step S300. The neutralizing agent may be at least one of a pulverized manganese-containing by-product, sodium hydroxide (NaOH), calcium hydroxide (Ca(OH)$_2$), magnesium hydroxide (Mg(OH)$_2$), calcium oxide (CaO), and magnesium oxide (MgO). Preferably, by using the pulverized manganese-containing by-product as the neutralizing agent, it is possible to reduce the amount of the separately added neutralizing agent, thereby reducing the costs and increasing the concentration of manganese in the leachate.

When the pulverized manganese-containing by-product is used as the neutralizing agent, a reducing agent may be additionally added to dissolve valuable metals contained in the additionally-added manganese-containing by-product. In this case, the same reducing agent as in the leaching step S300 may be used as the reducing agent.

After the neutralization step S400 is performed, the pH of the neutralized leachate may be about 3 to 5, preferably about 4 to 5.

Impurity Removal Step S500

After the neutralization step S400, an impurity removal step S500 for removing impurities in the neutralized leachate may be performed. The impurity removal step S500 may include a first impurity removal step and a second impurity removal step.

The first impurity removal step may be a heavy metal impurity removal step. In the first impurity removal step, a sulfide-based precipitant may be added to the neutralized leachate. Specifically, at least one of sodium sulfide (Na$_2$S), sodium hydrosulfide (NaSH), ammonium hydrosulfide (NH$_4$HS), and hydrogen sulfide (H$_2$S) may be used as the precipitant, whereby heavy metal impurities such as zinc, lead, cadmium, cobalt, nickel and copper can be removed. The reaction formula when sodium hydrosulfide is used as the precipitant is as follows.

$$2MSO_4 + 2NaSH \rightarrow Na_2SO_4 + H_2SO_4 + 2MS\downarrow \text{ (M=Zn, Pb, Cd, Co, Ni or Cu)} \quad \text{(Formula 2)}$$

The first impurity removal step may be performed at about 60 to 80 degrees C., and the precipitant may be added at an equivalent ratio of about 0.8 to 1.4 to the heavy metals contained in the neutralized leachate. After the first impurity removal step, the contents of zinc, lead, cadmium, nickel, copper, and cobalt contained in a first impurity-removed liquid may be lowered to 5 mg/L or less, respectively.

The second impurity removal step may be performed after the first impurity removal step. The second impurity removal step may be a light metal impurity removal step. In the second impurity removal step, a precipitant for precipitating light metal impurities may be added to the first impurity-removed liquid. Specifically, at least one of sodium fluoride (NaF), oxalic acid (C$_2$H$_2$O$_4$), and sodium oxalate (Na$_2$C$_2$O$_4$) may be used as the precipitant, whereby light metals such as calcium and magnesium can be removed. The reaction formula when sodium fluoride (NaF) is used as the precipitant is as follows.

$$MSO_4 + 2NaF \rightarrow Na_2SO_4 + MF_2\downarrow \text{ (M=Ca or Mg)} \quad \text{(Formula 3)}$$

The second impurity removal step may be performed at about 70 to 90 degrees C., and the precipitant may be added at an equivalent ratio of about 1 to 2.5 to the light metals contained in the first impurity-removed liquid. After the second impurity removal step, the contents of calcium and magnesium contained in a second impurity-removed liquid may be lowered to 50 mg/L or less, respectively.

Solvent Extraction Step S600

After the impurity removal step S500, a solvent extraction step S600 may be performed.

In the solvent extraction step S600, manganese may be separated from the process liquid (second impurity-removed liquid) after the impurity removal step S500 by using a solvent extraction method. Specifically, the process liquid after the impurity removal step S500 may contain substances such as sodium and potassium in addition to manganese. In the solvent extraction step S600, manganese can be selectively extracted in the form of an aqueous solution of manganese sulfate by using a solvent extraction method.

Figure 2:
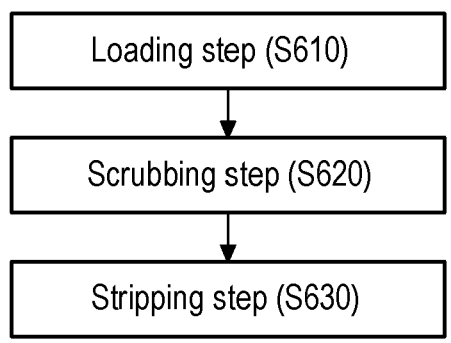
FIG. 2 is a process chart showing a solvent extraction step according to one embodiment of the present disclosure.

FIG. 2 is a process diagram showing the solvent extraction step S600 according to one embodiment of the present disclosure.

Referring further to FIG. 2, the solvent extraction step S600 may include a loading step S610, a scrubbing step S620, and a stripping step S630.

Loading Step S610

The loading step S610 is a step of extracting manganese contained in the process liquid into an organic phase by using an organic extractant (organic solvent) after the impurity removal step S500. As the organic extractant, at least one of di-2-ethylhexyl phosphoric acid, mono-2-ethylhexyl (2-ethylhexyl)phosphonate, and bis (2,4,4-trimethylpentyl) phosphinic acid may be used.

The reaction temperature in the loading step S610 may be about 30 to 50 degrees C., and the pH in the loading step S610 may be about 4 to 5. In order to achieve the pH range, at least one of sodium hydroxide (NaOH), sodium carbonate (Na$_2$CO$_3$), and sodium sulfate (Na$_2$SO$_4$) may be used.

After the manganese is extracted, the organic phase and the aqueous phase can be phase-separated by the difference in specific gravity. The extraction filtrate (aqueous phase) from which manganese is separated may be used as a process liquid in the pulverization and washing step S200. The organic phase is moved to the next solvent extraction step (i.e., the scrubbing step S620).

Scrubbing Step S620

After the loading step S610, a scrubbing step S620 may be performed on the organic phase which includes the extracted manganese. Specifically, impurities including sodium and potassium remaining in the organic phase may be removed by water-washing the organic phase. Thus, impurities contained in the organic phase can be removed while leaving high-purity manganese. As described above, the washing water after the scrubbing step S620 may be used for diluting the inorganic acid in the leaching step S300.
Stripping Step S630

After the scrubbing step S620, a stripping step S630 of recovering manganese extracted in the organic phase in the form of an aqueous solution of manganese sulfate may be performed. Specifically, in the stripping step S630, diluted sulfuric acid is added to the organic phase from which impurities are removed by the scrubbing step S620, so that manganese in the organic phase can be recovered in the form of an aqueous solution of manganese sulfate ($MnSO_4$).
Crystallization Step S700

A crystallization step S700 may be performed after the solvent extraction step S600.

In the crystallization step S700, the aqueous solution of manganese sulfate recovered in the solvent extraction step S600 may be evaporated and concentrated to produce manganese(II) sulfate monohydrate. The process of evaporating and concentrating the aqueous solution of manganese sulfate may be performed at about 50 to 120 degrees C., preferably at about 60 to 100 degrees C. If the temperature of the process of evaporating and concentrating the aqueous solution of manganese sulfate is lower than 50 degrees C., other kinds of manganese sulfate hydrate other than manganese(II) sulfate monohydrate may be produced. Specifically, if the temperature is 0 to 10 degrees C., manganese sulfate heptahydrate may be produced, and if the temperature is 10 to 50 degrees C., manganese sulfate tetrahydrate may be produced.

Figure 3:
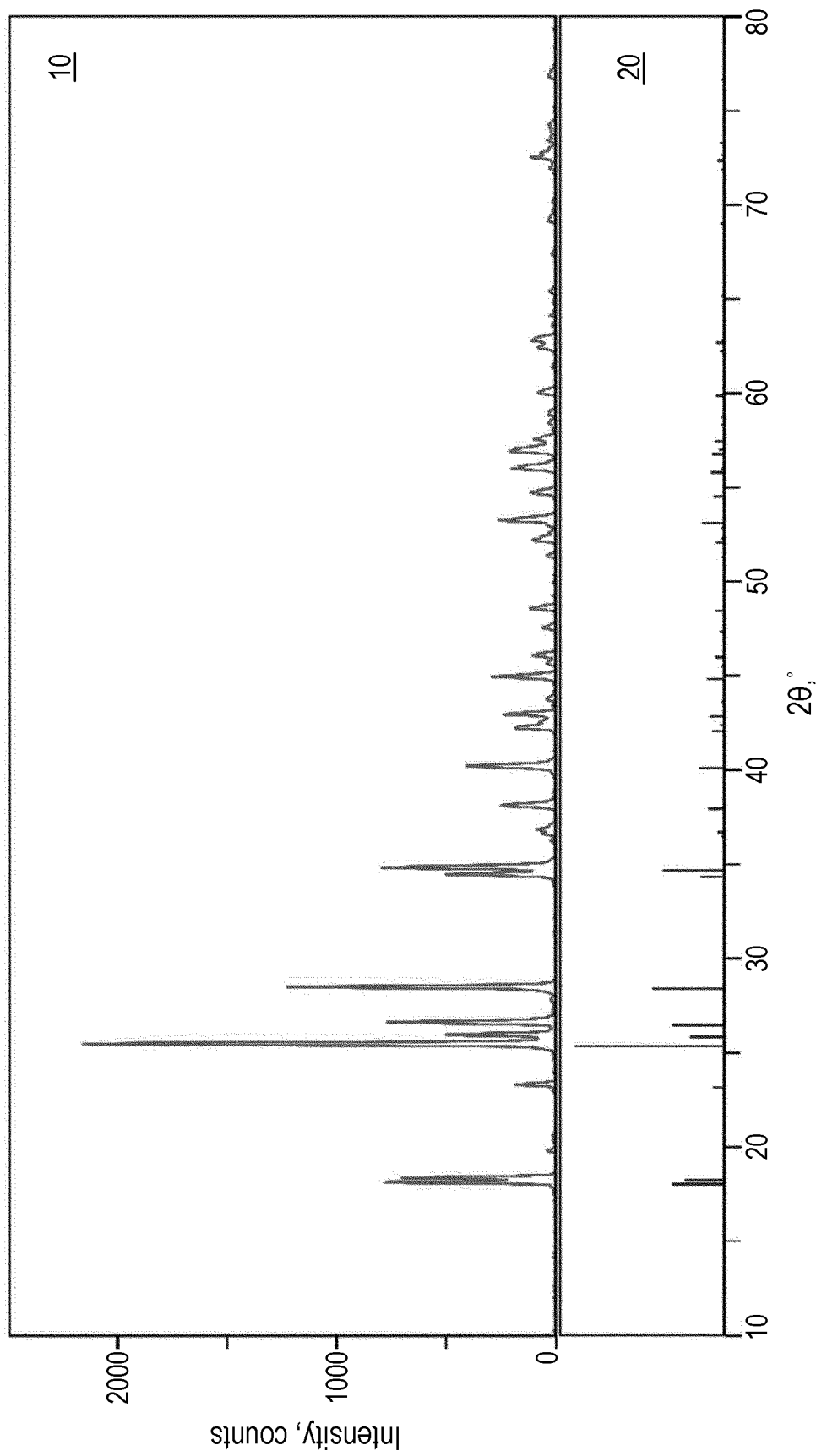
FIG. 3 is an XRD analysis graph for manganese(II) sulfate monohydrate produced according to one embodiment of the present disclosure.

FIG. 3 is an XRD analysis graph for manganese(II) sulfate monohydrate produced according to one embodiment of the present disclosure.

Referring to FIG. 3, there are shown an XRD peak 10 of manganese(II) sulfate monohydrate produced according to one embodiment of the present disclosure and an XRD peak 20 of manganese(II) sulfate monohydrate of JCPDS. It can be seen that the main peaks of the XRD peak 10 of manganese(II) sulfate monohydrate produced according to one embodiment of the present disclosure and those of the XRD peak 20 of manganese(II) sulfate monohydrate of JCPDS coincide with each other.

Manganese(II) sulfate monohydrate according to one embodiment of the present disclosure may have a manganese content of 32.0 wt % or more, and the contents of impurities may be as shown in Table 2 below.

TABLE 2

| Ca | K | Pb | Zn | Al | Cr | Cu | Fe | Mg | Na | Si |
|---|---|---|---|---|---|---|---|---|---|---|
| ≤100 | ≤120 | ≤10 | ≤10 | ≤20 | ≤10 | ≤5 | ≤10 | ≤150 | ≤150 | ≤100 |

(Unit: g/t)

Accordingly, manganese(II) sulfate monohydrate according to one embodiment of the present disclosure can be suitably used as a raw material for a cathode active material of a lithium secondary battery.

EXAMPLE (Raw Material Preparation Step)

In the step of preparing a raw material containing manganese, a manganese-containing by-product generated in an electrolysis process of a zinc hydrometallurgy process, which contains 40% of manganese, 2.2% of lead, 1.9% of zinc, and 2.8% of calcium was used as a raw material.

(Pulverization and washing Step)

Then, in order to improve the leaching efficiency, the manganese-containing by-product was pulverized, and water-soluble impurities such as magnesium, sodium, and zinc were removed through washing. At this time, the removal rates of major impurities were 57% for magnesium, 53% for sodium, and 83% for zinc. The average particle size of the manganese-containing by-product before pulverizing was about 800 μm, and the average particle size of the manganese-containing by-product after pulverizing for 1 hour was about 3.4 μm.

(Leaching Step)

Subsequently, 0.5 kg of the pulverized manganese-containing by-product, sulfuric acid, and 300 ml of 35% hydrogen peroxide were added and dissolved at 60 degrees C. for 2 hours and 30 minutes to obtain a leachate having a sulfuric acid concentration of 30 g/L and a manganese concentration of 70 g/L.

(Neutralization Step)

Subsequently, 0.1 kg of the pulverized manganese-containing by-product and 350 ml of 35% hydrogen peroxide were added to the leachate, and the leachate was neutralized at 60 degrees C. for 5 hours to raise the pH to 4. It was confirmed that the leaching rates of main elements are 99.7% for manganese, 16% for calcium, 98% for potassium, 0.3% for lead, and 99.8% for zinc.

(Impurity Removal Step)

Subsequently, in order to remove heavy metal impurities present in the neutralized leachate, 1.2 equivalents of sodium hydrosulfide (NaSH) was added and reacted at 60 degrees C. for 2 hours, thereby removing the impurities to a level of 0.1 mg/L or less through sulfide-based precipitation. Subsequently, in order to remove light metal impurities, 2.0 equivalents of sodium fluoride (NaF) was added and reacted at 70 degrees C. for 2 hours, thereby removing the impurities to a level of 50 mg/L or less through fluorine-based precipitation ($CaF_2$).

At this time, it was confirmed that the removal rates of major impurities are 99.3% for lead, 99.8% for zinc, and 93.8% for calcium.

(Solvent Extraction Step)

(Loading Step)

Subsequently, manganese was extracted using a 30% D2EHPA organic extractant at 40 degrees C. to recover manganese from the impurity-removed solution. At this time, sodium hydroxide (NaOH) was added to maintain the pH at 4.5. After manganese was extracted into an organic phase, the content of manganese remaining in an aqueous phase was 0.2 g/L.

(Scrubbing Step)

The organic phase including the manganese in was then washed with water at 40 degrees C. to remove impurities. At this time, the contents of the major impurities removed were 30 mg/L for potassium, 1.0 mg/L for magnesium, and 350 mg/L for sodium.

(Stripping Step)

Subsequently, diluted sulfuric acid was added to recover washed organic phase manganese into an aqueous phase, thereby extracting manganese into the aqueous phase. At this time, the concentration of manganese recovered in the form of an aqueous solution of manganese sulfate was 83 g/L.

(Crystallization Step)

Subsequently, the aqueous solution of manganese sulfate was crystallized at 100 degrees C. to obtain manganese(II) sulfate monohydrate (purity: 32.0 wt %). The composition of manganese(II) sulfate monohydrate is shown in Table 3 below.

TABLE 3

| Mn (wt %) | Ca | K | Pb | Zn | Al | Fe | Mg | Na |
|---|---|---|---|---|---|---|---|---|
| 32.0 | 68.2 | 36.2 | 0.2 | 3.7 | 1.1 | 1.5 | 114.2 | 138.2 |

(Unit: g/t, except for Mn)

COMPARATIVE EXAMPLES

Hereinafter, Comparative Examples for comparison with the Example will be described. In Comparative Examples 1 to 3, conditions other than the process conditions described below are the same as in the above-described Example.

Comparative Example 1

In the pulverization and washing step, the manganese-containing by-product was washed with water in an amount equal to (1 time) the amount of the manganese-containing by-product in order to remove impurities. At this time, the removal rates of major impurities were 49% for magnesium, 5% for sodium, and 5% for zinc.

Comparative Example 2

In the first impurity removal step, heavy metal impurities were removed by adding 0.75 equivalent of sodium hydrosulfide. At this time, the removal rates of major impurities were 98.7% for lead, and 65.2% for zinc.

Comparative Example 3

In the second impurity removal step, light metal impurities were removed by adding 0.5 times and 3 times sodium fluoride in an equivalent ratio. At this time, the removal rate of calcium, which is a major impurity, was 52% when the equivalent ratio of sodium fluoride is 0.5 times, and 84% when the equivalent ratio of sodium fluoride is 3 times.

The invention claimed is:

1. A method for producing manganese(II) sulfate monohydrate, comprising:
    a pulverization and washing step of pulverizing and washing a manganese-containing by-product;
    a leaching step of leaching the pulverized manganese-containing by-product after the pulverization and washing step to produce a leachate;
    a neutralization step of neutralizing the leachate produced in the leaching step;
    an impurity removal step of removing impurities from the leachate neutralized in the neutralization step,
        wherein the impurity removal step comprises:
            a first impurity removal step of removing heavy metal impurities, and
            a second impurity removal step of removing light metal impurities;
    a solvent extraction step of recovering manganese in the form of an aqueous solution of manganese sulfate from a process liquid subjected to the impurity removal step by using a solvent extraction method; and
    a crystallization step of producing manganese(II) sulfate monohydrate by evaporating and concentrating the aqueous solution of manganese sulfate produced in the solvent extraction step.

2. The method of claim 1, wherein an average particle size of the pulverized manganese-containing by-product is 1 to 25 μm.

3. The method of claim 1, wherein in the pulverization and washing step, the manganese-containing by-product is washed with water to remove water-soluble impurities.

4. The method of claim 3, wherein in the pulverization and washing step, an amount of water added for washing is 1.5 to 3 times an amount of the manganese-containing by-product in weight ratio.

5. The method of claim 1, wherein the leaching step is performed by using an inorganic acid and a reducing agent.

6. The method of claim 5, wherein in the leaching step, sulfuric acid is used as the inorganic acid, and hydrogen peroxide is used as the reducing agent.

7. The method of claim 1, wherein the neutralization step is performed by using at least one of the pulverized manganese-containing by-product, sodium hydroxide, calcium hydroxide, magnesium hydroxide, calcium oxide, and magnesium oxide.

8. The method of claim 1, wherein the first impurity removal step is performed through a precipitation reaction of heavy metal impurities by adding at least one of sodium sulfide, sodium hydrosulfide, ammonium hydrosulfide, and hydrogen sulfide as a precipitant.

9. The method of claim 8, wherein the precipitant is added at an equivalent ratio of 0.8 to 1.4 to the heavy metal impurities contained in the neutralized leachate.

10. The method of claim 1, wherein the second impurity removal step is performed through a precipitation reaction of light metal impurities by adding at least one of sodium fluoride, oxalic acid, and sodium oxalate as a precipitant.

11. The method of claim 10, wherein the precipitant is added at an equivalent ratio of 1 to 2.5 to the light metal impurities contained in a first impurity-removed liquid.

12. The method of claim 1, wherein the crystallization step is performed at a temperature of 60 to 100 degrees C.

13. The method of claim 1, wherein the manganese-containing by-product includes at least one of a manganese crust formed on a surface of an anode plate during an electrolysis process of a zinc hydrometallurgy process and a manganese slime formed on a bottom of an electrolysis cell during the electrolysis process of the zinc hydrometallurgy process.

14. The method of claim 1, wherein the solvent extraction step comprises:
    a loading step of extracting manganese contained in the process liquid into an organic phase,
    a scrubbing step of washing the manganese-extracted organic phase with water, and
    a stripping step of recovering manganese in the form of an aqueous solution of manganese sulfate by adding sulfuric acid to the organic phase after the scrubbing step.

15. A method for producing manganese(II) sulfate monohydrate, comprising:
    a pulverization and washing step of pulverizing and washing a manganese-containing by-product;
    a leaching step of leaching the pulverized manganese-containing by-product after the pulverization and washing step to produce a leachate;

a neutralization step of neutralizing the leachate produced in the leaching step;

an impurity removal step of removing impurities from the leachate neutralized in the neutralization step, wherein the impurity removal step comprises:
   a first impurity removal step of removing heavy metal impurities, and
   a second impurity removal step of removing light metal impurities;

a solvent extraction step of recovering manganese in the form of an aqueous solution of manganese sulfate from a process liquid subjected to the impurity removal step by using a solvent extraction method, the solvent extraction step comprising:
   a loading step of extracting manganese contained in the process liquid into an organic phase,
   a scrubbing step of washing the manganese-extracted organic phase with water, and
   a stripping step of recovering manganese in the form of an aqueous solution of manganese sulfate by adding sulfuric acid to the organic phase after the scrubbing step; and a crystallization step of producing manganese(II) sulfate monohydrate by evaporating and concentrating the aqueous solution of manganese sulfate produced in the solvent extraction step.

16. The method of claim 14, wherein washing water obtained after the scrubbing step is used for diluting an inorganic acid added in the leaching step.

* * * * *